US010754574B1

(12) United States Patent
Jo et al.

(10) Patent No.: US 10,754,574 B1
(45) Date of Patent: Aug. 25, 2020

(54) ATTRIBUTE-DRIVEN STORAGE FOR STORAGE DEVICES

(71) Applicant: Amazon Technologies, Inc., Seattle, WA (US)

(72) Inventors: Keun Soo Jo, Bellevue, WA (US); Munif M. Farhan, Clyde Hill, WA (US); Seth William Markle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 16/101,943

(22) Filed: Aug. 13, 2018

Related U.S. Application Data

(60) Provisional application No. 62/673,555, filed on May 18, 2018.

(51) Int. Cl.
| | |
|---|---|
| *G06F 12/00* | (2006.01) |
| *G06F 3/06* | (2006.01) |
| *G06F 12/02* | (2006.01) |
| *G11B 5/012* | (2006.01) |

(52) U.S. Cl.
CPC ............ *G06F 3/0649* (2013.01); *G06F 3/064* (2013.01); *G06F 3/0613* (2013.01); *G06F 3/0619* (2013.01); *G06F 3/0644* (2013.01); *G06F 3/0653* (2013.01); *G06F 3/0676* (2013.01); *G06F 12/0292* (2013.01); *G11B 5/012* (2013.01)

(58) Field of Classification Search
CPC .... G06F 3/0649; G06F 3/0613; G06F 3/0619; G06F 3/064; G06F 3/0644; G06F 3/0653; G06F 3/0676; G06F 12/0292; G11B 5/012
See application file for complete search history.

(56) References Cited

U.S. PATENT DOCUMENTS

| | | | | |
|---|---|---|---|---|
| 7,620,772 B1 * | 11/2009 | Liikanen | .............. | G11B 27/322 711/112 |
| 2015/0212938 A1 * | 7/2015 | Chen | ..................... | G06F 12/023 711/166 |
| 2018/0095695 A1 * | 4/2018 | Agombar | ................ | G06F 3/061 |

* cited by examiner

*Primary Examiner* — Shawn X Gu
(74) *Attorney, Agent, or Firm* — Klarquist Sparkman, LLP

(57) ABSTRACT

Technologies are provided for storing data in a storage device based on an associated attribute or attributes. A storage device can be configured to write data to a storage location of the storage device based on an associated attribute. The attribute can describe one or more storage-related requirements of the data. The storage device can identify one or more storage locations where the data can be stored that meet the storage-related requirements described by the attribute. A host computer can transmit an updated attribute for the data to the storage device to reflect new storage-related requirements for the data. The storage device can write the data to a new storage location that meets the new requirements. A mapping table can be maintained that associates a logical identifier for the data with the actual storage location where the data is stored.

18 Claims, 11 Drawing Sheets

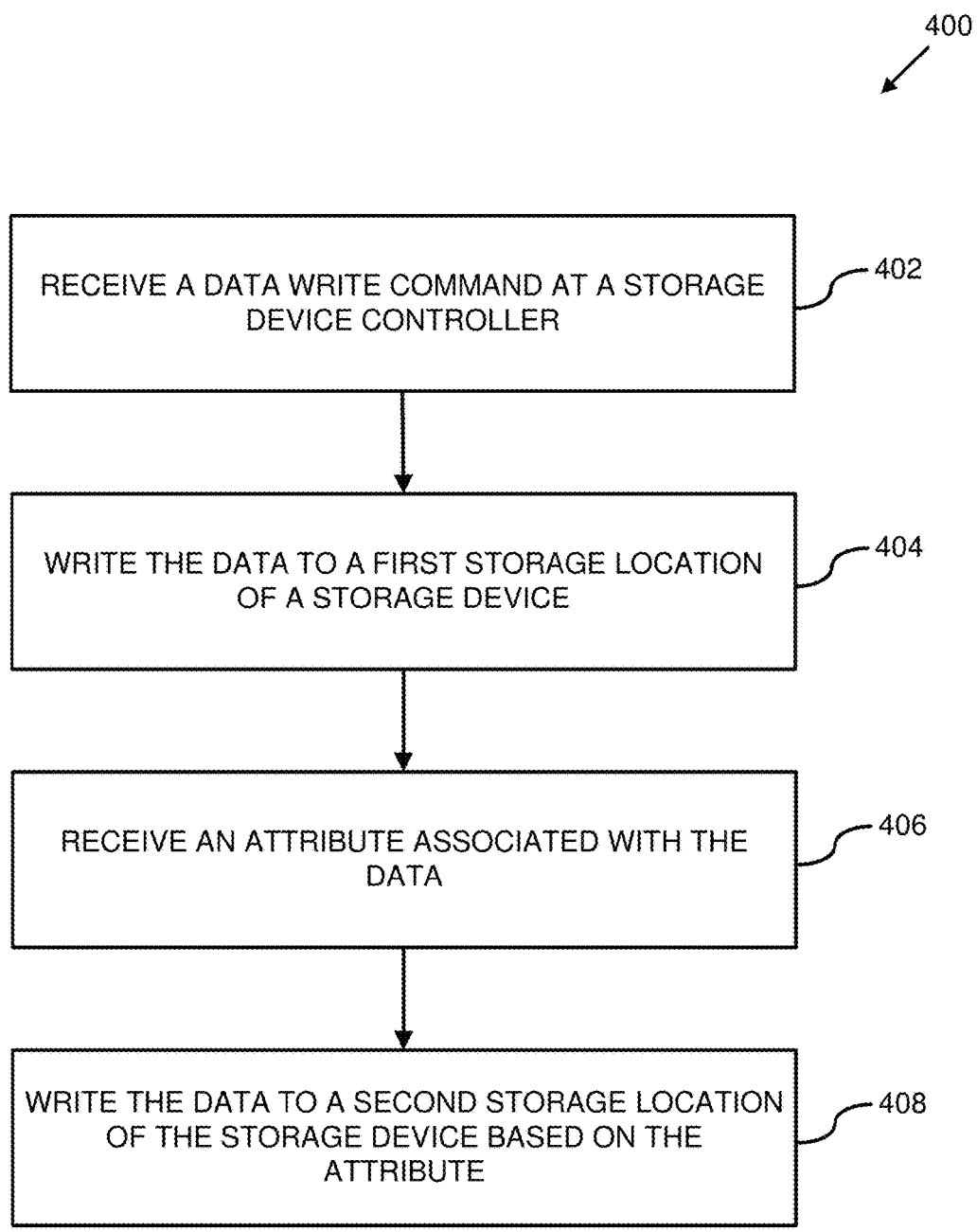

ATTRIBUTE-DRIVEN STORAGE FOR STORAGE DEVICES

BACKGROUND

Storage devices, such as hard disk drives (HDDs) and solid state storage devices (SSDs), can comprise various storage media where data can be stored. At least some storage devices (such as some solid state storage devices (SSDs) and some shingled magnetic recording (SMR) storage devices) organize data into multiple storage zones. Some such storage devices can have storage zones where data can be stored using different recording formats. For example, a zoned storage device comprising a magnetic disk can store data in one zone using a perpendicular magnetic recording (PMR) format and can store data in another zone using an SMR format. In at least some cases, a host computer connected to a storage device can specify a storage location in the storage device where data transmitted from the host computer to the storage device should be stored. The host computer can maintain a mapping table where various data are mapped to physical storage locations, such as zones, in a storage device where the data are stored.

BRIEF DESCRIPTION OF THE DRAWINGS

FIG. 4 is a flowchart of an example method for storing data in a storage device based on an attribute.

DETAILED DESCRIPTION

Figure 1B:
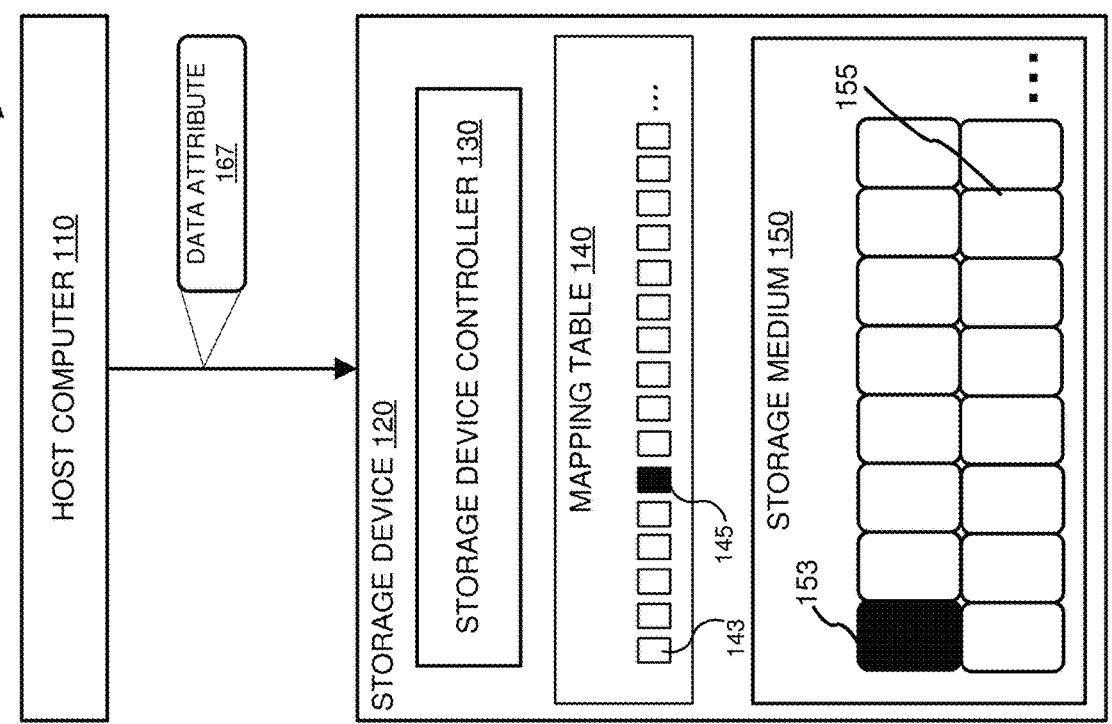
FIGS. 1A-B are system diagrams depicting an example system configured to store data using an attribute.

In at least some cases, different storage locations within a storage device can have different data access performance characteristics. For example, in at least some cases, data access times for data stored in a magnetic disk can increase as the area of the magnetic disk that is being accessed moves from an outer diameter of the magnetic disk to an inner diameter of the magnetic disk. This can occur when an outer diameter of the magnetic disk contains a higher number of storage locations (such as sectors) than an inner diameter of the magnetic disk and the disk is rotated at the same speed when accessing locations at both the outer and inner diameters. In another example, using a zoned storage device where data can be written to different zones using different storage formats, data written to a zone using one storage format may be able to be accessed at a faster rate than data written another zone using another storage format. In another example, using a storage device with multiple storage media, storage locations in different storage media may be accessed at different data access rates.

A storage location can be identified for storing given data based on storage-related requirements of the data. A storage location can be selected by examining access performance characteristics of the storage location, and determining whether the performance characteristics will meet the storage-related requirements of the data. As storage-related requirements of the data change over time, the data can be relocated (and/or duplicated) to different storage locations that meet the data's changing requirements. However, in scenarios where a connected host computer manages the storing of data in physical storage location of a storage device, moving the data from one storage location to another storage location can require multiple data access operations. This can require multiple data access operations, as data must be read from the storage device by the host computer and then written back to the storage device by the host computer. Furthermore, the host computer must update a record that tracks the physical storage location where the data is stored. In a scenario where this record is also persisted to the storage device, additional data access operations are necessary to update the record.

At least some of the embodiments of the technologies described herein solve these problems by enabling the storage device to select, and change, the storage location of data based on one or more attributes associated with the data. For example, a storage device can be configured to store data to a first storage location, receive an attribute associated with the data from a host computer, and then move the data to a second storage location based on the received attribute.

In a different or further embodiment, a host computer can be configured to transmit data to the storage device along with a logical identifier (such as a logical block address, etc.) for the data. The storage device can be configured to store the data in a storage location and maintain a mapping record that maps the logical identifier to an address of the storage location. The host computer can be configured to transmit an attribute associated with the data to the storage device. The attribute can describe one or more storage-related characteristics of the data (such as an access performance requirement for the data). The storage device can move (or duplicate) the data to another storage location in the storage device based on the attribute. The storage device can then update the mapping record to map the logical identifier for the data to the address of the other storage location. Thus, the host computer can continue to access the data using the logical identifier even as the storage device changes the underlying storage location of the data. By transmitting one or more attributes for the data to the storage device, the host computer can specify storage-related characteristics of the data that will be taken into account by the storage device when deciding where to store the data, without having to specifically control the physical storage of the data on the storage device.

In a different or further embodiment, the host computer can monitor data access characteristics of the data over time (such as a data access rate) and can transmit updated attributes for the data to the storage device based on detected changes. The storage device can change the underlying storage location of the data based on the changing attribute values.

Figure 1A:
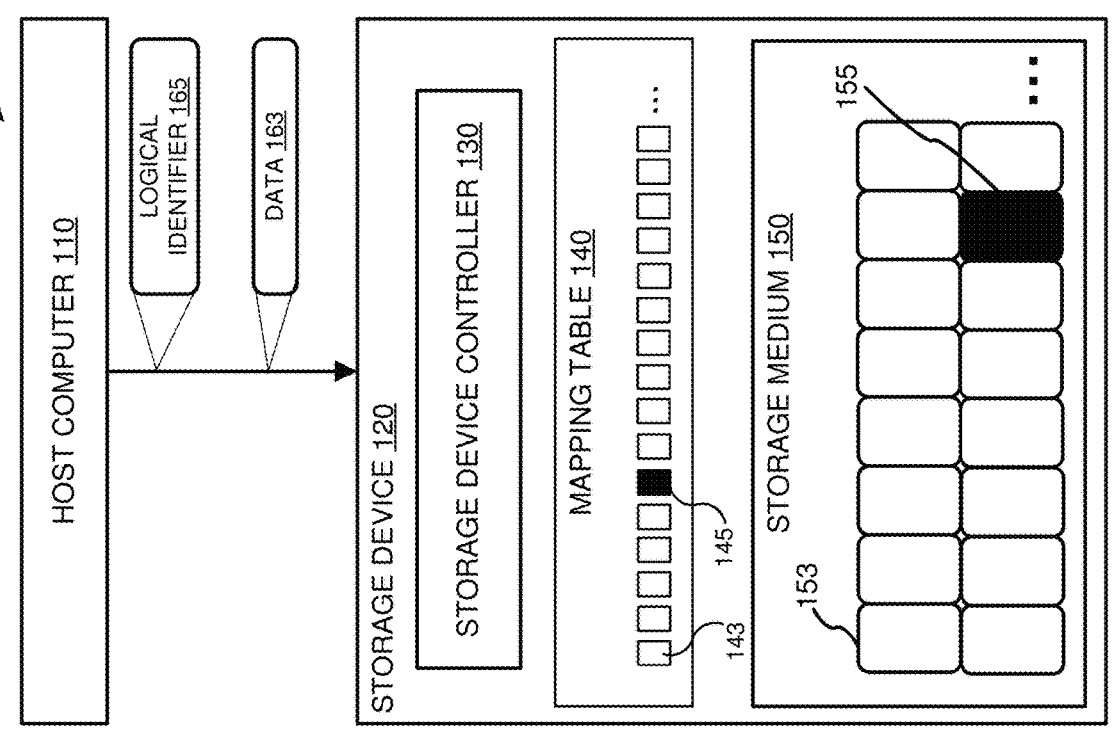

FIG. 1A is a system diagram depicting an example system 100 configured to store data using a mapping table 140 to associate logical data identifiers (e.g., 165) of data with physical storage locations (e.g., 153 and 155) where the data are stored in a storage device 120.

The example system 100 comprises a host computer 110 and the storage device 120. The storage device 120 comprises a storage device controller 130 and a storage medium 150. The storage medium 150 comprises multiple storage locations (e.g., 153 and 155). A storage location can comprise one or more data blocks, sectors, zones, or the like. The depictions of the storage locations of the storage medium 150 in FIGS. 1A-B are intended to be illustrative and do not necessarily reflect actual physical layouts of the storage locations in the storage medium 150. Furthermore, the number of storage locations depicted is not intended to be limiting. More or fewer storage locations are possible.

The host computer 110 is configured to transmit data access commands (such as data read commands and data write commands) to the storage device 120. As part of such a data access command, the host computer 110 transmits data 163 to the storage device 120, along with a logical identifier 165 that is associated with the data 163. The logical identifier 165 can comprise a numerical value, a character strings value, or some combination thereof. The host computer 110 can be configured to use the logical identifier 165 to logically identify the data 163. For example, the logical identifier 165 can be a logical address that is used by the host computer 110 to uniquely address the data 163.

The storage device controller 130 is configured to write the data 163 to a storage location in the storage medium 150. For example, in FIG. 1A the data 163 is depicted as having been written to the storage location 155 by the storage device controller 130. The storage device controller 130 is configured to use a mapping table 140 to associate the logical identifier 165 with the storage location 155 where the data 163 is stored in the storage medium 150. The mapping table 140 can be used by the storage device controller 130 to decouple the logical identifier 165 for the data 163 from the physical storage location 155 where the data is actually stored.

The storage device controller 130 can be configured to manage the mapping table 140. The mapping table 140 can comprise mapping entries (e.g. 143 and 145) that associate logical data identifiers (e.g., 165) with physical storage locations (e.g., 153 and 155) in the storage medium 150 where data associated with the logical identifiers are stored. For example, in FIG. 1A, the mapping entry 145 associates the logical identifier 165 with the storage location 155 where the data 163 has been stored by the storage device controller 130. The storage device controller 130 can be configured to use a mapping entry associated with a logical identifier to look up to a storage location where data associated with the logical identifier is physically stored. In at least some embodiments, the logical identifier 165 can be a logical zone address maintained by the host computer 110, and the physical storage address can be an address for a physical storage zone in the storage medium 150. The logical identifier and the physical address where data is stored can be different, and the logical identifier can be mapped to any physical storage location in the storage medium 150. For example, the mapping entry 145 associates the logical identifier 165 with the storage location 155 where the data 163 is stored.

In at least some embodiments, the mapping table 140 can be provided to the storage device controller 130 by the host computer 110 with one or more logical data identifiers predefined. Additionally or alternatively, the storage device controller 130 can be configured to add mapping entries to the mapping table 140 as previously unencountered logical identifiers are received from the host computer 110. For example, upon receipt of the data 163 and the associated logical identifier 165, the storage device controller 130 can be configured to look up the logical identifier 165 in the mapping table 140. If a mapping entry for the logical identifier 165 is not found in the mapping table 140, the storage device controller 130 can create a new mapping entry (e.g., 145) for the logical identifier 165. After writing the data 163 to the storage location 155, the storage device controller 130 can update the mapping entry (e.g., 145) for the logical identifier 165 to map the logical identifier 165 to the storage location 155.

One or more attributes can be associated with the data 163. In at least some embodiments, the one or more attributes for the data 163 can be stored in the mapping entry 145 in association with the logical identifier 165. One or more of these attributes can be used by the storage device controller 130 to identify a storage location in the storage medium 150 where the data 163 should be stored.

FIG. 1B depicts an example relocation of the data 163 within the storage device 120 based on an attribute 167 associated with the data 163. The attribute 167 can be stored in the mapping entry 145 in association with the logical identifier 165. The storage device controller 130 is configured to receive the attribute 167 from the host computer 110. Based on the attribute 167, the storage device controller writes the data to another storage location (e.g., 153) in the storage medium 150. In at least some embodiments, multiple attributes can be associated with the data 163. All of the attributes associated with the data 163 can be stored in the mapping entry 145 in association with the logical identifier 165. In such an embodiment, the data can be written to the storage location 153 based on more than one of the attributes associated with the data 163.

The storage device controller 130 can be configured to update the mapping entry 145 to associate the logical address 165 with the storage location 153 where the data 163 is now stored. Although the mapping table 140 is depicted in FIGS. 1A-B as being stored in the storage device 120, in at least some embodiments, the mapping table 140 can be stored externally to the storage device 120.

In at least some embodiments, the storage medium 150 can be a zoned storage medium and the storage locations (e.g., 153 and 155) can represent different storage zones. In such an embodiment, writing the data to the storage location 153 can comprise moving the data to another storage zone of the storage device 120.

In at least some embodiments, writing the data 163 based on the attribute 167 comprises moving the data 163 from the storage location 155 to the storage location 153. The storage location 155 then can be made available for storing other data. Alternatively, writing the data 163 based on the attribute 167 comprises copying the data 163 to the storage location 153. For example, the attribute 167 can indicate that the data 163 should be duplicated to one or more additional storage locations. The mapping entry 145 can be updated to indicate that the storage location 153 is a duplicated storage location for the data 163. In such an embodiment, the storage device controller 130 can be configured to write updates for the data 163 to all storage locations associated with the logical identifier 165 in the mapping table 140. The storage device controller 130 can be configured to read the data from any one or more of the storage locations associated with the logical identifier 165.

In any of the examples described herein, a host computer can be a server or other computing device that comprises a processor and is connected to a storage device. The host computer is connected to the storage device and is configured to transmit commands, such as data access commands (i.e., commands to perform data read and write operations) or the like, to the storage device. The host computer can be configured to transmit attributes for data to the storage device where the data is stored. The host computer can be configured to receive command responses from the storage device. The connection can be a direct connection, such as a cable or bus connection, an indirect connection, such as a connection over a network, or some combination thereof. In scenarios where the host computer is connected to more than one storage device, the various connections can be of the same type or different types.

In some embodiments, the host computer can comprise a storage controller connected to multiple storage devices. In at least some embodiments, the host computer can be a computing device configured to provide a unified access point for multiple connected storage devices, such as a JBOD ("just a bunch of drives/disks") device, a RAID array controller, etc.

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include flash storage devices (such as NAND-type flash devices and NOR-type flash devices), and random access data storage devices (such as DRAM devices). Further examples of storage devices include non-volatile dual in-line memory modules (NVDIMMs). In at least some embodiments, the storage device can be contained within a host computer.

In some embodiments, the storage device comprises multiple disparate storage media. For example, the storage device can be a hard disk drive that comprises one or more magnetic disks and an internal memory. In another example, the storage device comprises solid state storage and magnetic storage. Other combinations of disparate storage media are also possible.

A storage device can organize storage locations into multiple storage zones. For at least some storage devices (such as zoned SMR storage devices), random-access write operations can be performed by reading all data from a zone, updating the retrieved data, and writing the updated data back to the zone.

A storage device can include a storage device controller. A storage device controller can comprise one or more hardware components of the storage device. The storage device controller can further comprise a firmware that controls the operation of one or more hardware components of the storage device. The storage device controller can be configured to interface with an external communications channel in order to receive and process commands from one or more computing devices.

Additionally or alternatively, the storage device controller can be implemented at an intermediate layer between a host computer and the storage device. Such an intermediate layer controller can comprise software (such as a driver) and one or more processors, a system-on-chip (SoC), a field-programmable gate array (FPGA), and/or an application-specific integrated circuit (ASIC). In at least some embodiments, the storage device controller can comprise a host bus adapter connected to the storage device and a communication bus of a host computer.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device. A data block can also have a logical identifier, such as a logical block address (LBA), which can be used by external components to identify and access the data block. By using logical addresses, the physical storage locations of data blocks in the storage device can change without having to notify or update any external components.

In any of the examples described herein, a data block can be an example of a storage location. Other example storage locations include data block ranges, storage zones, etc.

Figure 2:
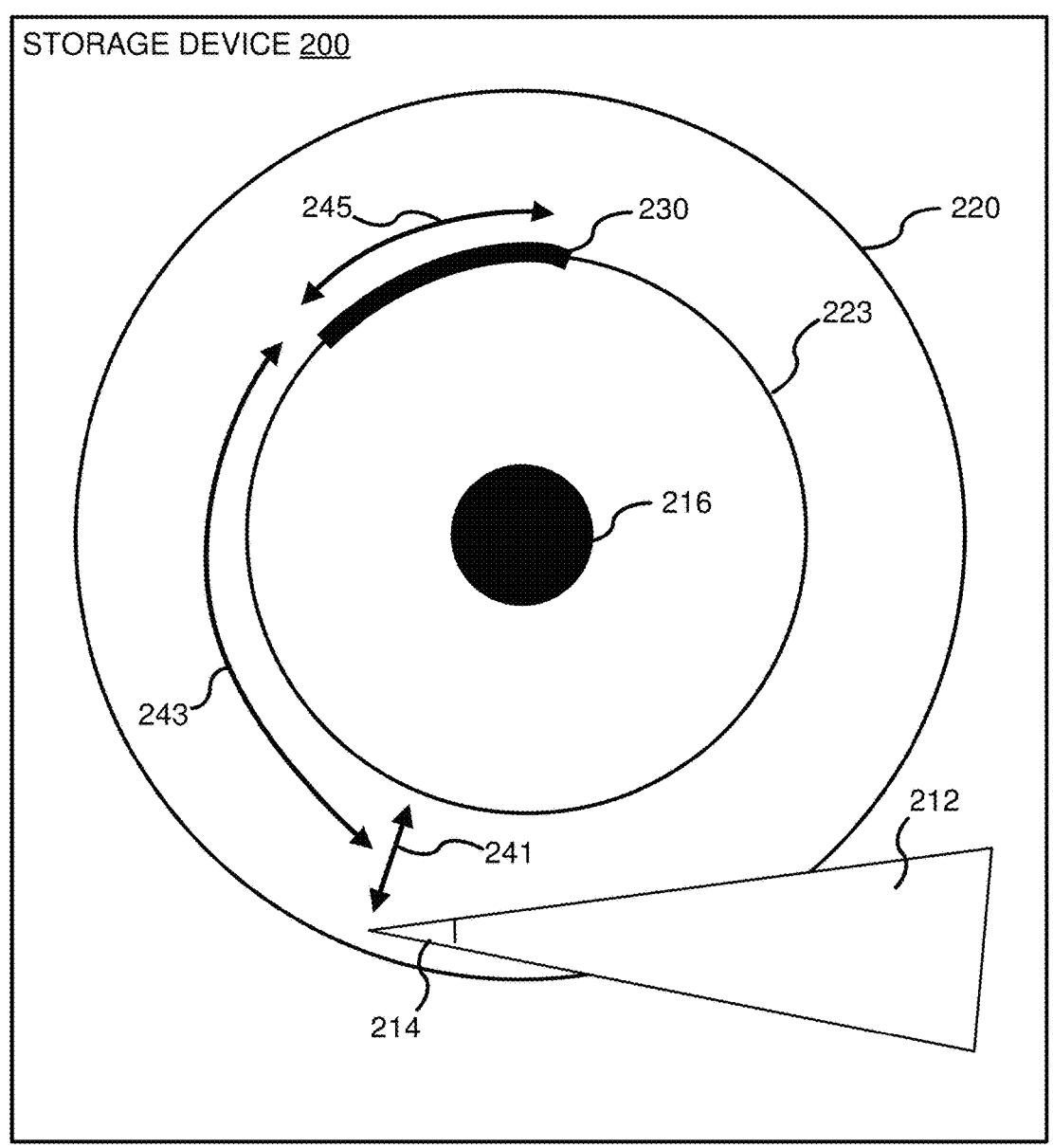
FIG. 2 is a system diagram depicting example performance factors in a storage device.

FIG. 2 is a system diagram depicting example performance factors in an example storage device 200. The storage device 200 comprises a magnetic storage medium 220, an actuator arm 212, and a read/write head 214. Factors that can impact storage device performance can include: seek time latency from head positioning on a target track, rotational latency from the motor to turn the disk to exact location within the track, and/or transmission latency. Transmission latency is a metric of areal density (e.g., BPI (bits per inch)), as well as rotation speed.

By way of example, a seek time latency 241, rotational latency 243, and transmission latency 245 for accessing example data 230 are depicted. The seek time latency 241 represents a time it takes to move the actuator arm 212 in order to position the read/write head 214 over a track 223 where the data 230 is stored. The rotational latency 243 represents a time it takes to rotate the storage medium 220 about a central spindle 216 in order to position a first accessible portion of the data 230 under the read/write head 214. The transmission latency 245 represents the time it then takes to access the data 230 using the read/write head 214.

In at least some cases, storage device transmission time can degrade (i.e., increase) as the area of the storage medium that is being accessed moves from an outer region (OD) of the storage medium (e.g., a disk platter) to an inner region (ID) of the storage medium. This can occur when the OD has a higher number of sectors (or bits of storage) than the ID and the OD and ID have a same or similar aerial density. Thus, in such scenarios, more data can be transferred per rotation of a storage medium at the OD of the storage medium than the ID of the storage medium.

Figure 3B:
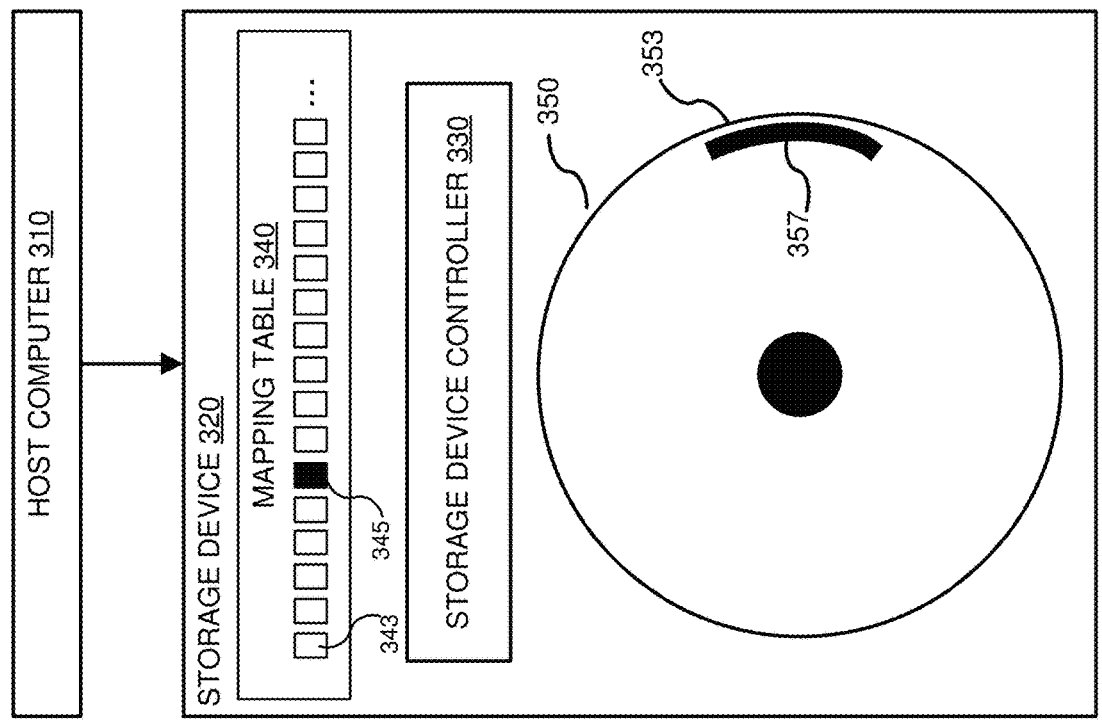
FIGS. 3A-B are system diagrams depicting an example system configured to relocate data on a magnetic storage medium based on an associated attribute.
Figure 3A:
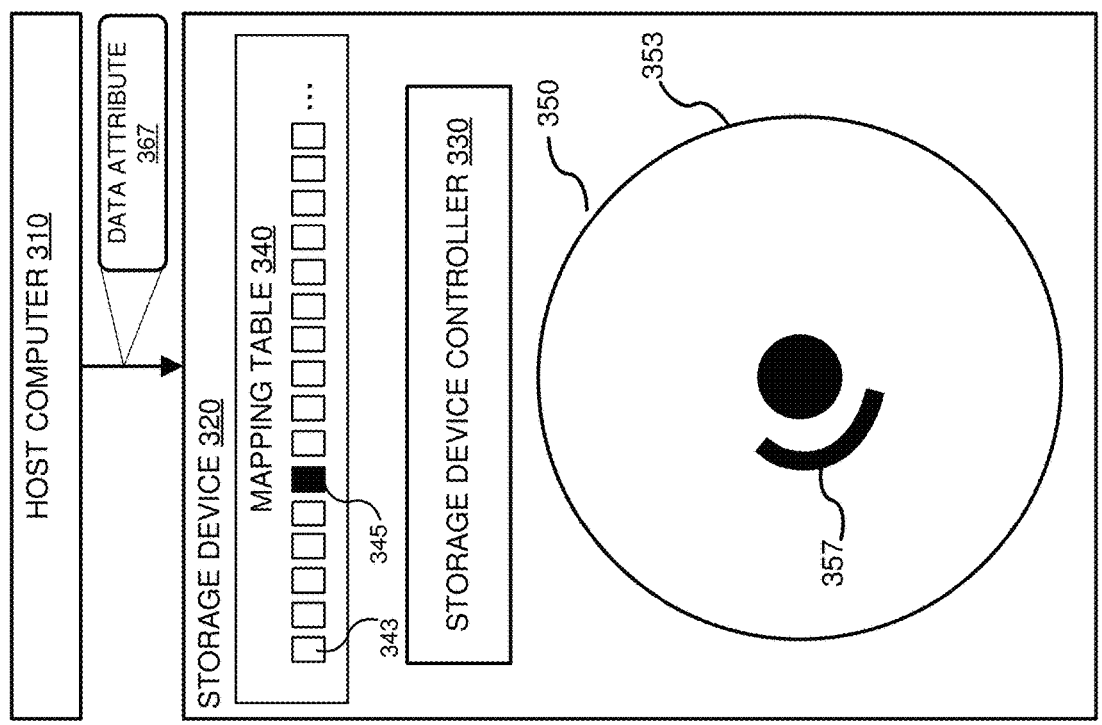

FIG. 3A is a system diagram depicting an example system 300 configured to relocate data 357 based on one or more associated attributes (e.g., 367). The example system 300 comprises a host computer 310 and a storage device 320. The storage device 320 comprises a storage device controller 330 and a storage medium 350 comprising a magnetic disk 353. The storage device controller 330 is configured to use a mapping table 340 to associate logical identifiers for various data with physical storage locations in the storage medium 350 where the data are stored. The mapping table 340 comprises multiple mapping entries (e.g. 343 and 345) that associate various logical data identifiers with storage locations in the storage medium 350. For example, in FIG. 3A the mapping entry 345 associates a logical identifier (not shown) for the data 357 with the storage location on the magnetic disk 353 where the data 357 is stored.

The host computer 310 is configured to transmit a data attribute 367 that is associated with the data 357 to the storage device 320. In at least some embodiments, the logical identifier for the data 357 can be transmitted by the host computer 310 to the storage device 320 in combination with the data attribute 367. The storage device controller 330 can be configured to change a storage location of the data 357 based on the data attribute 367. For example, the attribute 367 can identify a data access priority level for the data 357. Based on the access priority level of the data 357, the storage device controller 330 can be configured to change a storage location of the data 357 on the magnetic disk 353 to adjust a data access time for the data 357.

FIG. 3B depicts the example system 300, wherein the data 357 has been moved to another storage location that is relatively closer to an outer diameter of the magnetic disk 353 than the previous storage location of the data 357 (depicted in FIG. 3A). In at least some embodiments, data stored relatively closer to the outer diameter of the magnetic disk 353 can be accessed at a faster rate than data stored relatively closer to an inner diameter of the magnetic disk 353. Thus, the storage device controller 330 can be configured to adjust a transmission time of the data 357 by moving the data 357 closer to, or farther away from, the outer diameter of the magnetic disk 353.

In at least some embodiments, the host computer 310 can be configured to monitor an access rate for the data 357. If the access rate for the data 357 exceeds a specified threshold, the host computer 310 can transmit an attribute (e.g., 367) to the storage device 320 to increase the access priority level for the data 357. Responsive to receiving the attribute, the storage device controller 330 can relocate the data 357 to a storage location that can be accessed at a faster access rate than the current storage location of the data 357 (such as a storage location that is closer to the outer diameter of the magnetic disk 353). Subsequently, if the access rate for the data 357 falls below the specified threshold, the host computer can transmit an updated attribute to the storage device to decrease the access priority level for the data 357. Responsive to receiving the updated attribute, the storage device controller 330 can relocate the data 357 to another storage location that can be accessed at a slower access rate (such as a storage location that is closer to an inner diameter of the magnetic disk 353).

FIG. 4 is a flowchart of an example method 400 for storing data in a storage device based on an attribute associated with the data. Any of the example system described herein can be used to perform the example method 400. For example, all or part of the example method 400 can be performed by a host computer and a storage device as described herein.

At 402, a data write command is received at a storage device controller. In at least some embodiments, the storage device controller can comprise one or more components of a storage device, one or more components external to the storage device, or some combination thereof. The data write command comprises data to be written to the storage device. In at least some embodiments, the data write command further comprises a logical identifier (such as a logical address, etc.) associated with the data. For example, the logical identifier can comprise an alpha-numerical value that is used by a host computer to uniquely identify the data. In a particular example, the data represents a logically distinct data object and the logical identifier is a unique identifier for the data object.

At 404, the data is written to a first storage location of the storage device. The storage device can comprise a mapping table that can be used by the storage device to correlate logical data addresses with physical addresses of storage locations in the storage device. In an embodiment where the data write command comprises a logical identifier associated with the data, and the storage device comprises a mapping table, the mapping table can be updated to associate the logical identifier with the first storage location. In at least some embodiments, the mapping table can be stored in a same storage medium as the first storage location where the data is stored. Alternatively, the mapping table and the first storage location can be stored in separate storage media of the storage device.

At 406, an attribute associated with the data is received at the storage device controller. The attribute can describe one or more characteristics of the data. For example, the attribute can indicate whether an observed access rate for the data is above or below the specified threshold. Additionally or alternatively, the attribute can indicate that a write access endurance for the storage location where the data is stored is above or below a specified threshold. Additionally or alternatively, the attribute can indicate one or more storage characteristics of the data. For example the attribute can indicate that the associated data should be duplicated to multiple storage locations in the storage device.

At 408, the data is written to a second storage location of the storage device based on the attribute. In at least some embodiments, the attribute can indicate that an access rate for the data is above a specified threshold. It can be determined that the second storage location can be accessed at a higher access rate than the first storage location. For example, in an embodiment where the storage device comprises a magnetic disk, it can be determined that a storage location that is relatively closer to the outer diameter of the magnetic disk than the data's current storage location can be accessed at a higher data access rate than the current storage location.

Additionally or alternatively, the attribute can indicate that a write access endurance for the first storage device location is below a specified threshold. In such an embodiment, writing the data to the second storage location based on the attribute can comprise determining that the second storage location has a write access endurance that is above the specified threshold. For example, in some storage devices the storage integrity of at least some storage locations can degrade as data is repeatedly written to them. After data is written to such a storage location a certain number of times, the effectiveness of subsequent data write operations targeting the storage location can be ineffective or unreliable. In such a scenario, write operations targeting the first storage location can be tracked and, when data has been written to the storage location a sufficient number of times to exceed the specified threshold, the attribute can be received, indicating that the first storage location has exceeded the write access endurance threshold. The data can then be moved to another storage location that has not exceeded the write access endurance the actual. In at least some embodiments, a storage device controller of the storage device can internally track writes for various storage locations and set the attribute to indicate that the first storage location has exceeded the write endurance threshold.

In at least some scenarios, writing the data to the second storage location can comprise copying the data to the second storage location. For example, the attribute can indicate that the associated data should be duplicated to multiple storage locations. Storing the data redundantly in multiple, separate storage locations in some cases can increase an overall data access rate of the data. This can occur, for example, when the data is stored in multiple locations on a magnetic disk, thereby reducing the average seek time to move the actuator arm to a track where a copy of the data is stored. The attribute can be stored on the storage device in association with the logical identifier for the data. One a subsequent update to the data is received that includes the logical identifier, the attribute can be used to determine that the data is duplicated and that the update must be applied to both the first storage location and the second storage location.

In at least some embodiments, the storage device comprises multiple storage zones and writing the data to the second storage location comprises moving the data from one zone of the storage device to another zone of the storage device. In at least some such embodiments, data is written to different zones of the storage device using different recording formats having different data access rates and/or different storage densities. For example, in an embodiment where the storage device comprises a magnetic storage medium, the first storage location can be part of a first zone of the storage device where data is written using an SMR format, and the second storage location can be part of a second zone of the storage device for a data is written using a perpendicular magnetic recording (PMR) format. In such an embodiment, data can be stored at a higher storage density in the first zone of the storage device than in the second zone, but data can be accessed (in at least some scenarios) at a faster data access rate in the second storage zone. Additionally or alternatively, the storage device can comprise separate storage zones located on separate storage media. For example, the storage device can be a hybrid storage device comprising a magnetic storage medium in combination with a solid state storage medium, an internal memory, etc.

In an embodiment where the data write command comprises a logical identifier associated with the data, a mapping table can be updated to associate the logical identifier with the second storage location. Subsequently, a data read command, requesting the data, can be processed using the mapping table entry. For example, the data read command can comprise the logical identifier for the data. The logical identifier can be used, along with the mapping table, to read the data from the second storage location. The logical identifier can be used as a look up index into the mapping table, where the logical identifier is associated with a physical storage location identifier for the second storage location. The physical storage location identifier can then be used to retrieve the data from the second storage location of the storage device.

In at least some embodiments, the logical identifier for the data can be an identifier that is used by a host computer to uniquely identify the data. The host computer can transmit the data read command, comprising the logical identifier for the data, to the storage device. The storage device can use the logical identifier to look up the second storage location using the mapping table stored internally in the storage device. In a different or further embodiment, the mapping table can be received at the storage device from the host computer and stored in a storage medium of the storage device. For example, the host computer can be configured to initialize the storage device with an initial version of the mapping table that is pre-loaded with logical identifiers that are associated with various data that the host computer intends to store on the storage device.

In at least some embodiments, the storage device controller can determine that the data cannot be stored in a storage location that satisfies a requirement of the attribute. If such a determination is made, the storage device controller can transmit a notification to a connected host computer, indicating that the requirement of the attribute cannot be satisfied. For example, in a scenario where the attribute indicates a requested access rate for the data, but the storage device is unable to locate an available storage location that can be accessed at the requested access rate, the storage device can transmit a notification to the host computer, indicating that the access rate requirement of the attribute cannot be met. For example, in a scenario where the attribute indicates a write endurance for the data is below a specified threshold, but the storage device is unable to locate an available storage location with a write endurance above the specified threshold, the storage device can transmit a notification to the host computer, indicating that the write endurance requirement of the attribute cannot be met. For example, in a scenario where the attribute indicates that the data should be duplicated, but the storage device is unable to locate an available storage location to which the data can be duplicated, the storage device can transmit a notification to the host computer, indicating that the duplication requirement of the attribute cannot be met.

Figure 5:
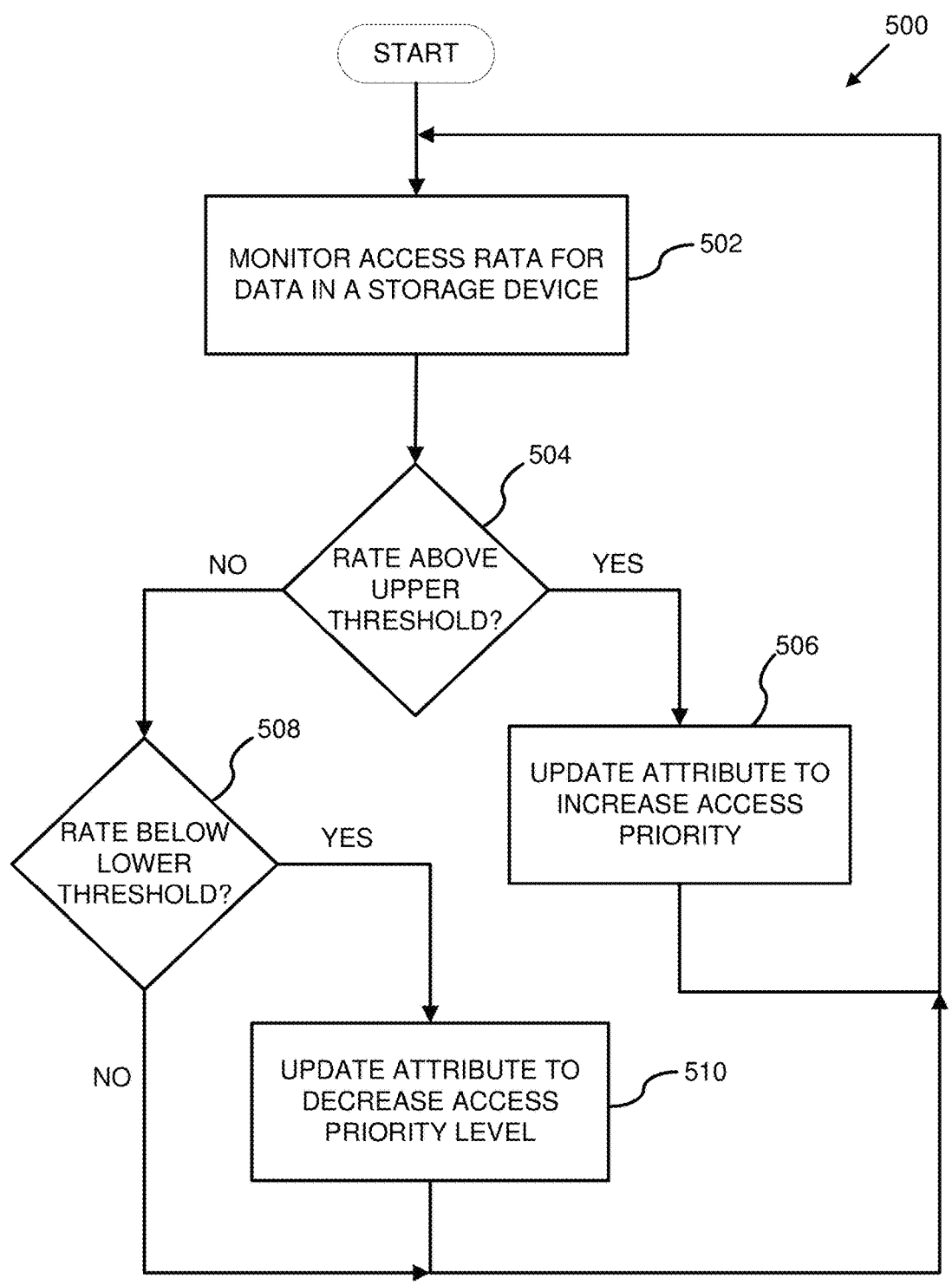
FIG. 5 is a flowchart of an example method for updating an attribute for data based on a data access rate of the data.

FIG. 5 is a flowchart of an example method 500 for updating an attribute for data stored in a storage device based on a data access rate of the data. Any of the example systems described herein can be used to perform the example method 500. For example, all or part of the example method 500 can be performed by a host computer, a storage device controller, or some combination thereof.

At 502, an access rate for the data stored in the storage device is monitored. The access rate for the data can be monitored by a host computer configured to transmit data access commands to the storage device. Additionally or alternatively, the access rate for the data can be monitored by a controller of the storage device. The monitoring the access rate for the data can comprise tracking a number of data access requests that identify the data over a given period of time (such as an hour, a minute, a second, etc.). In at least some embodiments, the data is associated with the logical identifier. This logical identifier can be used to uniquely identify the data and to track data access requests for the data. For example, each time a data access request (such as a data read request, a data write request, etc.) is received that contains the logical identifier for the data, a counter associated with the data can be incremented. After the specified time period has elapsed, a current value of the counter can be retrieved and used as a current data access rate for the data. The counter, and a timer used to track the time, can then be reset and subsequently used to track a new data access rate for the data for a subsequent time period.

At 504, it is determined whether the data access rate for the data is above a specified upper threshold rate. The specified upper threshold rate can be specified by an administrator. For example, the specified upper threshold can be defined by an administrator in a host computer connected to the storage device. Alternatively, the administrator can define the specified upper threshold in a centralized storage location, and the host computer can be configured to retrieve the specified upper threshold from the centralized storage location.

If the data access rate for the data is above the specified threshold, then at 506 an attribute associated with the data is updated to increase an access priority of the data. Increasing the access priority of the data can comprise moving the data to another storage location in the storage device. For example, the data can be moved to a storage location that is relatively closer to an outer diameter of a magnetic disk of the storage device then the data's current storage location.

Additionally or alternatively, the data can be moved to a storage location in a different zone of the storage device that can be accessed at a faster access rate than the data's current storage location. Additionally or alternatively, the data can be moved to a different storage medium that can be accessed at a faster access rate than the data's current storage location.

If the data access rate for the data is not above the specified upper threshold, then at 508 it is determined whether the data access rate is below a specified lower threshold rate. The specified lower threshold rate can be specified by an administrator. For example, the specified lower threshold can be defined by an administrator in a host computer connected to the storage device. Alternatively, the administrator can define the specified lower threshold in a centralized storage location, and the host computer can be configured to retrieve the specified lower threshold from the centralized storage location.

If the data access rate is below the specified lower threshold rate, then at 510 the attribute associated with the data is updated to decrease the access priority level of the data. As with updating the attribute at 506 to increase the access priority level of the data, decreasing the access priority level for the data can comprise moving the data to another storage location in the storage device. For example, the data can be moved to a storage location that is relatively closer to an inner diameter of a magnetic disk of the storage device than the data's current storage location. Additionally or alternatively, the data can be moved to a storage location in a different zone of the storage device that can be accessed at a slower access rate than the data's current storage location. Additionally or alternatively, the data can be moved to a different storage medium that can be accessed at a slower access rate than the data's current storage location. As a trade-off for the slower access rate, the different storage zone and/or storage medium may have a relatively higher storage density than the zone/medium where the data is currently stored.

If the access rate for the data is not above the specified upper threshold and is also not below the specified lower threshold, or after the attribute for the data is updated at 506 or 510, control returns to 502. Thus, the example method 500 can be repeated to adjust the access priority level of the data as the access rate of the data changes over time. In embodiments where changing the access priority level of the data comprises changing a storage location of the data in the storage device, the storage location of the data can be changed dynamically as the data access rate of the data changes over time.

Although a single upper threshold and a single lower threshold are discussed above, in at least some embodiments, multiple upper thresholds and multiple lower thresholds can be specified. For example, multiple access rate ranges can be defined and associated with different access priority levels. When the access rate for the data exceeds an upper threshold for its current access priority level, it can be promoted to a next-highest access priority level. Promoting the data to the next-highest access priority level can comprise updating the attribute for the data at 506. On a subsequent iteration of the example method 500, an upper threshold for the data's new access priority level can be used at 504. In at least some embodiments, the lower threshold for the data's new access priority level can be the same as the upper threshold of the data's previous access priority level.

The multiple access rate ranges can be defined and associated access priority levels can be specified by an administrator. For example, the multiple access rate ranges can be defined and associated access priority levels can be defined by an administrator in a host computer connected to the storage device. Alternatively, the administrator can define the multiple access rate ranges. The multiple access rate ranges can be defined and associated access priority levels in a centralized storage location. The host computer can be configured to retrieve the multiple access rate ranges from the centralized storage location.

If the access rate for the data drops below the lower threshold for the data's current level, then the data can be demoted to a next-lowest access priority level. On a subsequent iteration of the example method 500, a lower threshold for the data's new access priority level can be used at 508. In at least some embodiments, the upper threshold for the data's new access priority level can be the same as the lower threshold of the data's previous access priority level.

Figure 6:
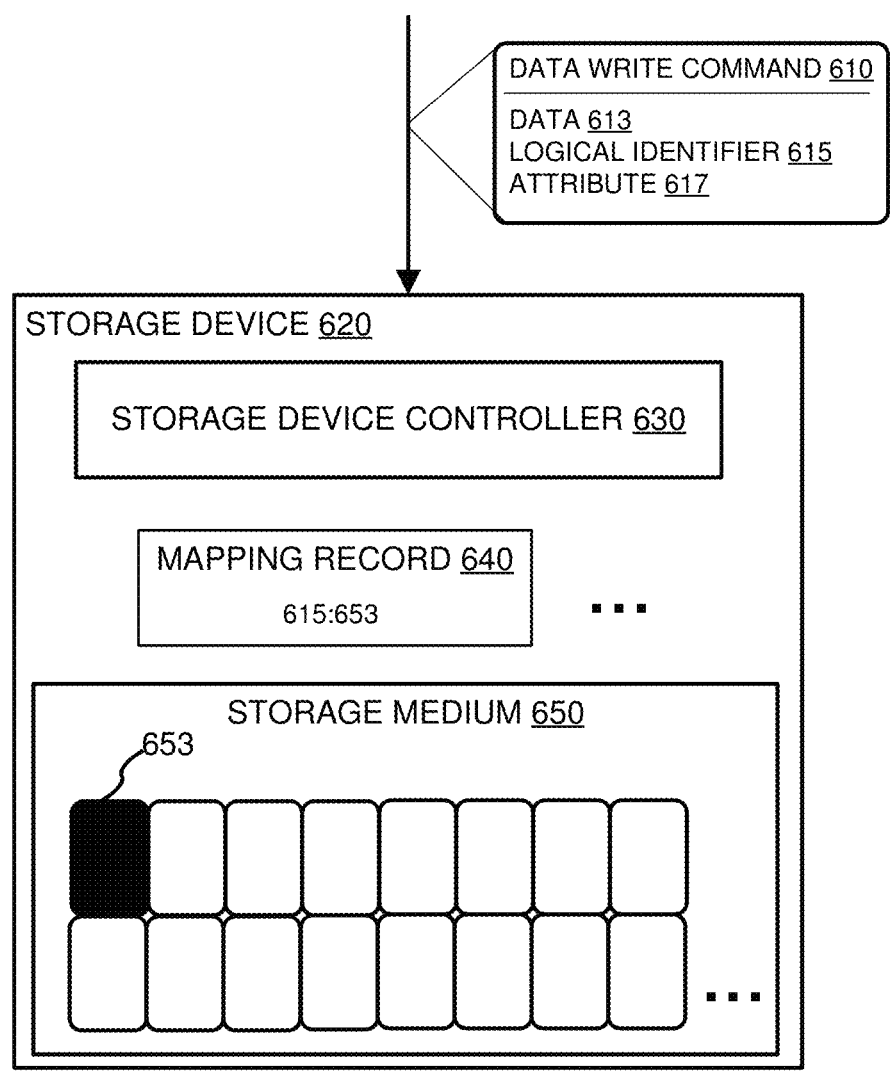
FIG. 6 is a system diagram depicting an example storage device configured to store data based on an associated attribute.

FIG. 6 is a system diagram depicting an example storage device 620 configured to store data 613 based on an associated attribute 617. The example storage device 620 comprises a storage device controller 630 and a storage medium 650. The storage medium 650 comprises multiple storage locations (e.g., 653) where data can be stored.

The storage device controller 630 can be configured to receive a data write command 610 comprising the data 613, a logical identifier for the data 615, and the attribute 617 that is associated with the data. The storage device controller 630 is configured to identify a storage location 653 in the storage medium 650 based on the attribute 617 and to write the data 613 to the storage location 653. The attribute 617 can indicate one or more storage-related characteristics of the data 613. For example, the attribute 617 can indicate a desired access level for the data 613. In such an embodiment, identifying the storage location 653 for the data 613 can comprise determining that a data access rate associated with the storage location 653 meets or exceeds an access rate requirement of the desired access level. Additionally or alternatively, the attribute 617 can indicate that the data 613 should be duplicated to multiple storage locations of the storage medium 650. In such an embodiment, the data 613 can be written to multiple storage locations of the storage medium 650. In at least one such embodiment, the attribute 617 can indicate a duplication level associated with the data 613 that can be used by the storage device controller 630 to determine a number of copies of the data 613 to store in the storage medium 650.

The storage device controller 630 is further configured to create a mapping record 640 associating the storage location 653 with the logical identifier 615 for the data 613. The storage device controller 630 can process a subsequent data read command (not shown) comprising the logical identifier 615 by using the mapping record 640. Using the mapping record 640, the storage device controller 630 can determine that the data 613 associated with the logical identifier 614 is stored in the storage location 653. In at least some embodiments, the storage device controller 630 is further configured to store the attribute 617 in the mapping record 640. In such an embodiment, the storage device controller 630 can use the mapping record 640 to determine what attribute or attributes is/are associated with data stored in the storage location 653 and/or are associated with the logical identifier 615. For example, the mapping record 640 can support a two-way lookup where either the logical identifier or a physical address of the storage location can be used by the storage device controller to retrieve the mapping record 640.

In a different or further embodiment, the mapping record 640 can be stored in one or more storage locations of the storage medium 650. In an embodiment where the attribute 617 indicates that the data 613 should be duplicated to multiple storage locations in the storage medium 650, the multiple storage locations can be associated with the logical identifier 615 in the mapping record 640.

The storage device controller 630 can be configured to receive an updated attribute (not shown) associated with the data 613. Upon receipt of the updated attribute, the storage device controller 630 can identify another storage location in the storage medium 650 based on the updated attribute, and to move the data 613 to the other storage location. For example, the updated attribute can indicate a new desired data access level for the data 613. Storage device controller 630 can determine whether the current storage location 653 of the data 613 has a data access rate that satisfies the requirements of the new desired data access level. If it cannot, then the storage device controller 630 can identify another storage location that has a data access rate that can satisfy the requirements of the new desired data access level. The storage device controller 630 then can move the data 613 to the other storage location. The other storage location can be located closer to an outer diameter (or inner diameter) of the magnetic disk of the storage medium 650 than the storage location 653. Additionally or alternatively, the other storage location can be located in different zone of the storage medium 650 than the storage location 653. Alternatively, the other storage location can be located in another storage medium (not shown) of the storage device 620.

Additionally or alternatively, the updated attribute can indicate that a write access endurance for the storage location 653 is below a specified threshold. For example, the storage location 653 may support a limited number of data write operations before the storage location 653 is rendered unusable, or before mandatory maintenance must be performed on the storage location 653. In such an embodiment, the identifying the other storage location in the storage medium 650 can comprise determining that the other storage location has a write access endurance that is above the specified threshold.

In at least some cases, the storage device controller 630 can detect that the write access endurance for the storage location 653 is below the specified threshold and can set the attribute in the mapping record 640 to indicate this. If a subsequent data write command is received that comprises the logical identifier 615 and an updated version of the data 613, the storage device controller 630 can detect the presence of the attribute in the mapping record 640. Rather than writing the updated version of the data 613 to the storage location 653, the storage device controller 630 can locate another storage location and write the updated version of the data 613 to the another storage location. In at least some embodiments, the storage device controller 630 can then mark the storage location 653 as unusable and/or schedule the storage location 653 for a mandatory maintenance operation to reclaim the storage location.

After moving the data 613 to the another storage location (or writing the updated version of the data 613 to the another storage location), the storage device controller 630 can update the mapping record 640 to remove the association between the logical identifier 615 and the storage location 653, and to associate the logical identifier 615 with the another storage location instead. Thus, the logical identifier 615 can still be used to access the data using subsequent data access commands even though the storage device controller 630 has changed an underlying storage location of the data 613 based on the attribute.

Figure 7:
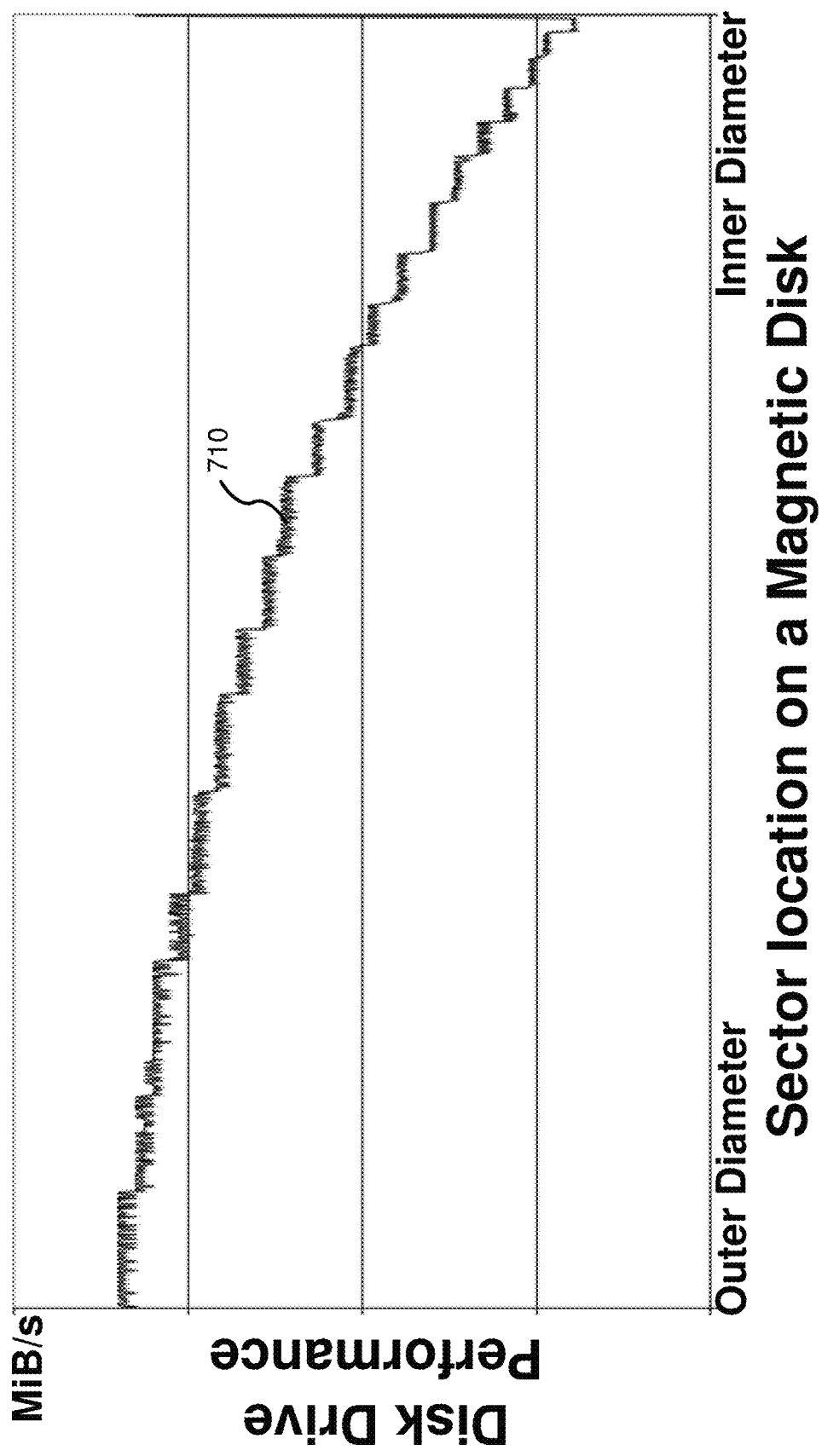
FIG. 7 is a chart depicting a relationship between data access time and storage location on a magnetic storage medium.

FIG. 7 is a chart depicting a relationship between data access time and storage location on a magnetic storage medium. The x-axis of FIG. 7 represents ranges of storage locations on a magnetic disk. The storage locations are represented in FIG. 7 as fractions of a total capacity of the magnetic disk. An outer diameter (OD) is represented as 0% of the magnetic disk's total capacity, and an inner diameter (ID) is represented as 100% of the magnetic disk's total capacity. The y-axis of FIG. 7 depicts a range of data access times, measured in mebibytes (MiB) per second. The line 710 represents average data access times when data is accessed at the various storage locations on the magnetic disk. As can be seen in FIG. 7, data access performance (as indicated in MiB/second) can degrade in some cases when the accessed storage location moves from locations near the OD to locations near the ID. This may occur, for example, if the linear velocity is higher at the OD compared to the ID; and can result in higher data transfer rates at the OD, as compared to the ID.

At least some SMR storage devices are zoned block devices (ZBDs). A ZBD divides drive space into multiple zones of a same or similar size (e.g., zones of 256MiB). At least some ZBDs do not allow random write operations within a zone; instead only allowing sequential write operations within the zone. This behavior can be similar to NAND blocks in an SSD, where data must be written in block-sized chunks. The management of zones in at least some zoned storage devices can be similar to the management of a flash translation layer (FTL) used by some NAND-based storages.

Figure 8:
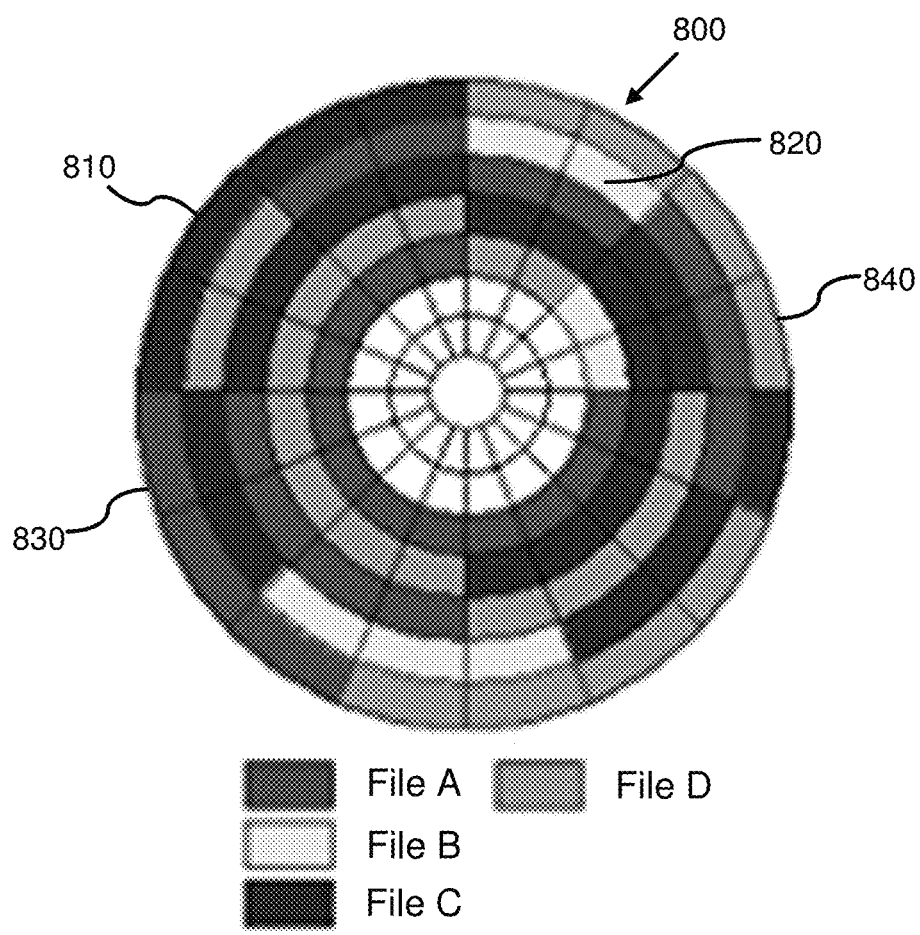
FIG. 8 is a diagram depicting example files stored in various storage locations of an example storage device.

FIG. 8 is a diagram depicting example files stored in various locations of a storage device in various states of fragmentation. In at least some scenarios, a file system can store a file in a way such that the file is divided into many smaller chunks (e.g., clusters of a same or similar size (such as 4 kilobytes, etc.)). These chunks can be scattered across various storage locations of the storage device, which may degrade data access performance for the file. For example, in FIG. 8 multiple data chunks are scattered across an example storage medium 800. 810 is a chunk of a first file (File A), 820 is a chunk of a second file (File B), 830 is a chunk of a third file (File C), and 840 is a chunk of a fourth file (File D). Although some chunks for a given file are stored contiguously, others are stored elsewhere in the storage medium 800. Rather than having all the data for each file stored contiguously, various chunks of the multiple files are interspersed. Thus, the files are considered to be fragmented.

Such fragmentation can be exacerbated as time goes on. For example, a file system may divide a file into many smaller chunks. These chunks can be scattered all over the storage medium 800, which can degrade the data access performance of the storage medium 800.

Figure 9:
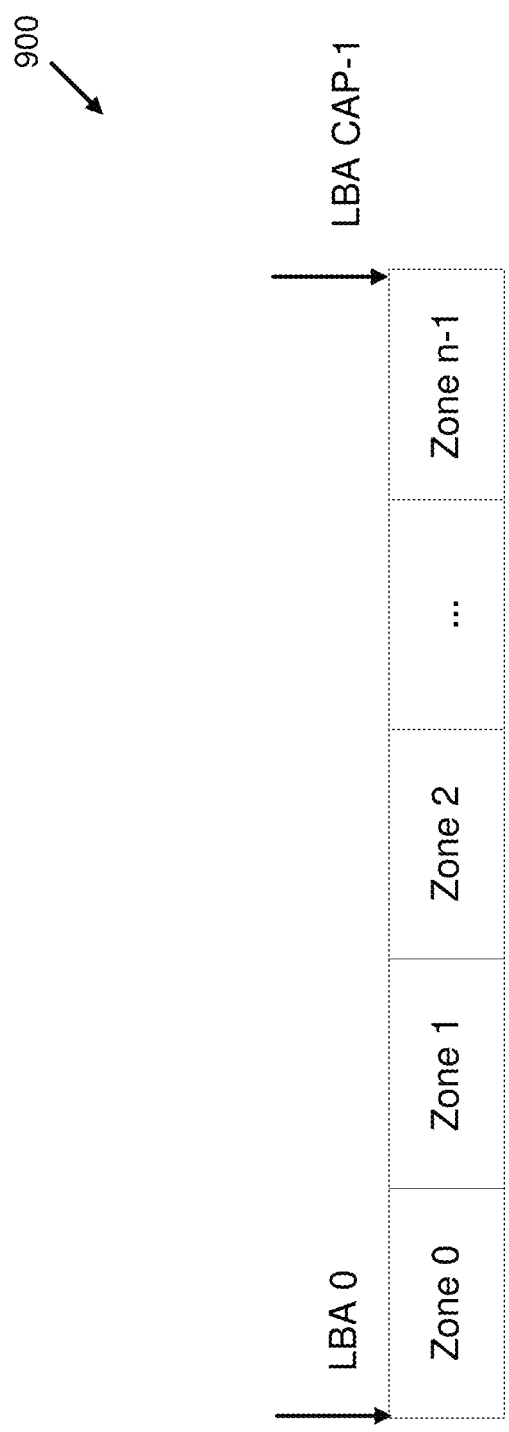
FIG. 9 is a diagram depicting an example logical-to-physical address mapping for a zoned storage device.

FIG. 9 is a diagram depicting an example logical-to-physical address mapping 900 for a zoned storage device. The example mapping 900 can be used in any of the examples described herein to define an initial mapping between a logical address space and the storage zones of one or more storage devices.

FIG. 9 depicts a range of logical block addresses (LBA 0-LBA CAP−1) that are mapped to physical storage location addresses in a zoned storage device (represented by Zone 0-Zone n−1), where "CAP" represents a capacity, or total number of storage locations, in the storage device, and "n" represents the number of zones in the storage device. A one-to-one mapping can be used, wherein there is a one-to-one correlation between the logical addresses and the physical storage location addresses in the zoned storage device. Using such a mapping, each zone in the storage device can be represented by a range of logical addresses. Such a mapping can be used to facilitate indirect addressing for data stored in a storage device. For example, a host computer can be configured to transmit data access commands that identify data using logical addresses. The logical-to-physical mapping can be used to identify physical storage locations associated with the logical addresses.

In at least some embodiments, a controller of the storage device can be configured to create and/or store the logical-to-physical address mapping. Additionally or alternatively, the logical-to-physical mapping can be created by a host computer connected to the storage device.

Some storage devices comprise multiple storage zones. Such storage devices can be referred to as zoned storage devices. An example zoned storage device is a ZBD. A ZBD can divide drive space into multiple zones (such as 256 megabyte chunks). In at least some zoned storage devices (such as those that support shingled magnetic recording (SMR) storage formats), a zone can be regarded as a fundamental storage unit (or block) for writing data to the storage device. For example, a random write operation may not be allowed within a zone. To update data within a zone, all data is read from the zone, modified, and then written back to the same zone (or a different zone). Other example ZBDs include solid state storage devices (SSD's) that write data to NAND storage a block at a time. In at least some embodiments, management of zone storage can be implemented at an intermediate layer (such as an FTL for a NAND-based storage device, or the like). Such an intermediate layer can be implemented at a host computer, a storage device controller, a bus adapter, etc.

A mapping table can be used to map virtual (or logical) addresses to physical storage locations (such as data blocks, zones, etc.) within a storage device. Such a mapping of physical addresses (e.g., physical zones) to logical addresses (e.g., logical block addresses) that are used by a host computer can be handled dynamically by the storage device.

In at least one embodiment, a drive controller can run an algorithm to monitor zone temperature (i.e. read/write access frequency). The drive controller can relocate "cold data" (data with a relatively low access frequency) to a zone closer to an inner diameter of the ZBD and can relocate "hot data" (data with a relatively high access frequency) to a zone closer to an outer diameter of the ZBD. This process can be referred to as "auto-tiering" of the stored data. This operation can be transparent to a host computer connected to the ZBD. A mapping table can be used to decouple logical data addresses used by the host computer from the underlying zone storage locations where the data is stored in the ZBD. Data within the same zone can have a likelihood of all being written at a same or similar time, and the data in the zone may have a similar data temperature and life time. Using at least some of the disclosed embodiments, the performance and user experience can improve by relocating entire zones of data on a storage medium based on associated data temperatures. Such a benefit may be especially pronounced in drives with relatively larger storage capacities, but relatively lower I/O per second (IPS) per terabyte (TB).

In a different or further embodiment, a storage device that maps logical identifiers to storage locations using techniques described herein can provide a thin provisioning of the storage device. For example, a controller of the storage device can report that the device has more storage locations available than it actually does. Additionally or alternatively, zones can be provisioned using a PMR format until certain space utilization is reached. This can be done to take advantage of PMR's superior random-access write performance, as compared to SMR. The controller can then start to convert PMR zones to SMR transparently as the storage device's available storage capacity falls below a given threshold.

In a different or further embodiment, certain host zone addresses can be pinned to specific physical zone locations explicitly. This can be done, for example, for the sake of better performance for accessing the data associated with the host zone addresses. Other benefits are also possible. Pinning a host zone address can be done, for example, by specifying an attribute for the data associated with the host zone address that indicates that the data should be stored in a specific storage location on the storage device and should not be relocated. Such an attribute can be specified as part of a command to store the data in the storage device. Additionally or alternatively, such an attribute can be specified as part of a separate command, wherein the attribute is provided in association with an identifier for the data.

In a different or further embodiment, a host can assign attributes to logical storage addresses. The attributes can specify different levels of performance, endurance, redundancy, data reliability, etc. A storage device controller can be configured to manage data associated with a given logical address based on the associated attributes. For example, the storage device controller can write data to a storage location in the storage device based on one or more associated attributes provided by the host computer. In a particular example, an attribute can indicate that associated data has a high data access performance requirement. Based on this attribute, the controller can write the associated data to a storage location that has a relatively higher data access rate (such as an OD of a magnetic disk, an internal memory, etc.). In a different or further example, an attribute can indicate that associated data has a high reliability requirement. Based on such an attribute, the storage device controller can assign a plurality of physical storage locations to the logical address associated with the data and can duplicate the associated data in the plurality of storage locations.

In at least one embodiment, a storage device controller can be configured to scan storage media of the storage device and report a physical address count of all the available physical blocks and corresponding zones. A host computer can then create a logical association for each physical zone on the device with logical zone address. Such associations can be stored in a data structure (such as a mapping table) created by the host computer. Once the mapping table is created, in at least some embodiments, it can be stored on one or more storage media of the storage device. The host computer can be configured to recover the mapping table from the storage device in the event of data loss.

The host computer can be configured to continuously monitor input/output (TO) attributes associated with various data (e.g., the attributes can be associated with logical addresses associated with the data) and place the data in physical locations on the storage media of the storage device based on the attributes. This can allow for data movement within the device without impacting the host's logical addressing for the data. In at least some cases, this can be done by a storage device controller without the use of resources of the host computer. For example, the storage device controller can be configured to move data to another physical storage location, and update a mapping in the mapping table to associate a logical address of the data with the new storage location. Thus, the storage device controller can optimize storage locations for data based on associated attributes without affecting the host computer's data addressing scheme.

In an embodiment where the storage device comprises a magnetic disk, the data on the device can be intelligently placed on the magnetic disk based on performance attributes (e.g., with respect to an OD and/or ID of the magnetic disk).

In at least some embodiments, a Global Mapping Layer (GML) can be used to extend a logical address space to cover physical storage locations in multiple storage devices. The storage devices need not necessarily be of a single type. For example, a given logical address space can cover multiple magnetic disk storage devices, multiple solid state storage devices, multiple tape storage devices, or any combination thereof. In at least some embodiments, data can be moved from a storage location in one storage device to a storage location in another storage device based on one or more attributes associated with the data. For example, data with an attribute that indicates the data is in high demand can be relocated from a storage device with a relatively lower data access rate (such as a magnetic disk drive) to a storage device with a relatively higher data access rate (such as a solid-state storage device). Since a single logical address space is used by the host computer, such relocations across storage devices need not require any change to applications accessing the data.

An underlying controller or adapter may be used by the host computer to route data access requests to the appropriate storage device based on a mapping table that maps the logical addresses in the logical address space to the physical storage locations in the various storage devices. In at least some embodiments, an agent (such as a controller, adapter, etc.) can be configured to relocate data across the storage devices and update a mapping table to associate logical addresses of the data with their new storage locations. Thus, data can be moved across storage devices based on performance requirements with any changes to the logical address space used by the host computer to access the data.

Figure 10:
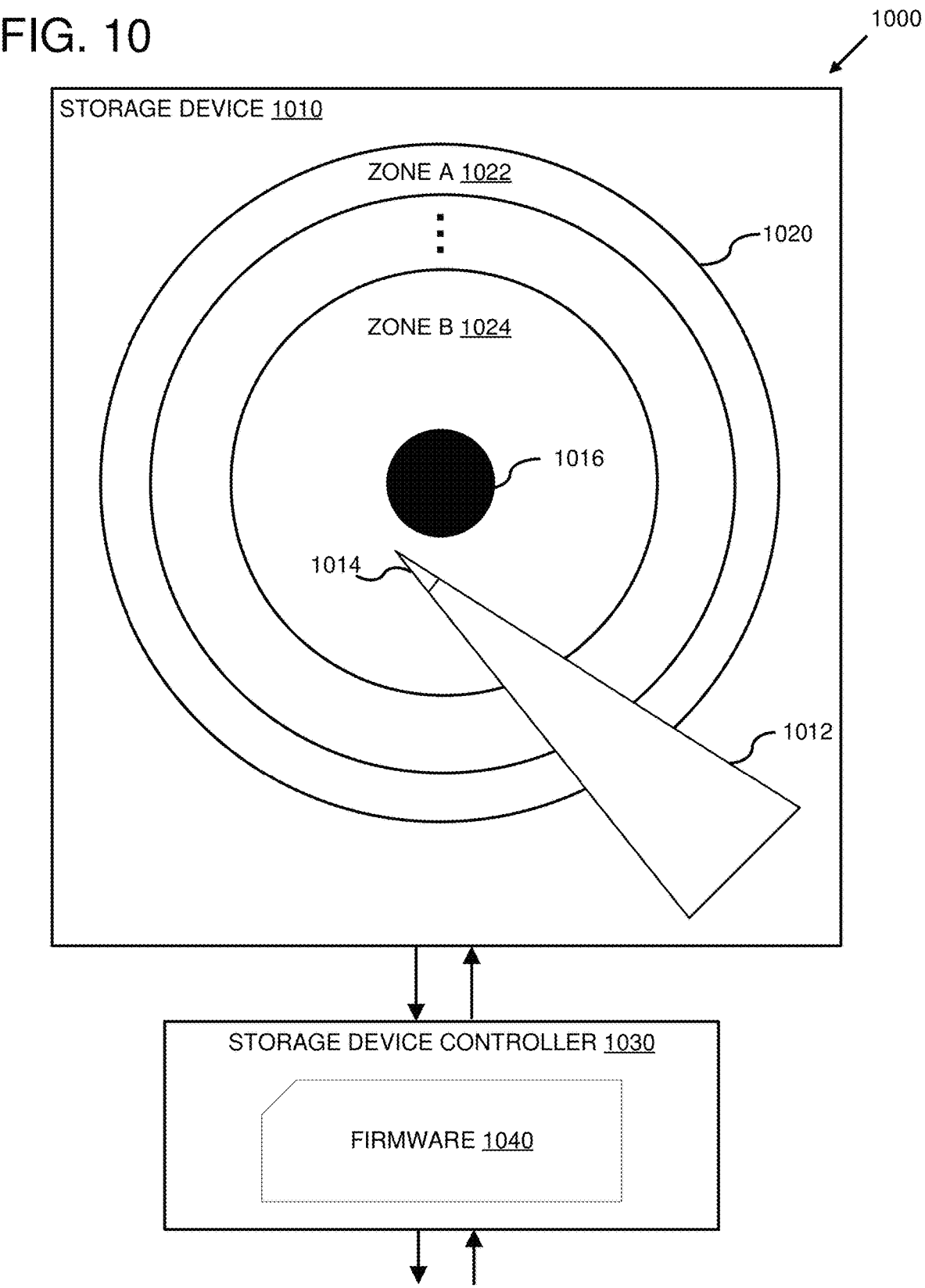
FIG. 10 is an example system comprising a storage device comprising multiple storage zones.

FIG. 10 is a system diagram depicting an example storage device 1000 comprising multiple storage zones 1022-1024. The example storage device 1000 can be used as a storage device in any of the examples described herein.

Storage device 1010 comprises a magnetic disk 1020 that can be rotated on a spindle 1016. The storage device 1010 also comprises a moveable actuator arm 1012 with a read/write head 1014. The actuator arm 1012 can be rotated on an actuator axis (not shown) by an actuator (not shown) to move the read/write head 1014 over different portions of the magnetic disk 1020. The storage device 1010 is configured to write data to and to read data from the magnetic disk 1020 using the read/write head 1014. The read/write head 1014 can comprise a single head that can perform both read and write operations. Alternatively, the read/write head 1014 can comprise two separate heads for reading and writing, respectively. The storage device 1010 can be configured to use the read/write head 1014 to write data to the magnetic disk 1020 in multiple concentric circular tracks as the magnetic disk is rotated on the spindle 1016.

A storage device controller 1030 can send write and read access commands to the storage device 1010 to write data to and read data from the storage device 1010. The storage device controller 1030 can specify a location on the magnetic disk 1020 at which the data is to be written or from which the data is to be read. For example, each unit of data stored on the magnetic disk 1020 can have a unique address, such as an LBA, that is associated with a location on the magnetic disk 1020 where the data is stored. The storage device controller 1030 can be configured to map such logical addresses to physical storage locations of the data (such as a physical block address). Additionally or alternatively, the storage device controller 1030 can be configured to store attributes in association with data stored on the magnetic disk 1020. For example, the attributes can be stored on the magnetic disk 1020 in association with the logical addresses and/or the physical addresses. Such attributes can be used by the storage device controller 1020 to determine if/when to change physical storage locations of data associated with the attributes as described herein. In at least some embodiments, data can be written to the storage device 1010 using one or more data write operations that include the data to be written and one or more attributes associated with the data.

The storage device controller 1030 can designate separate zones 1022-1024 on the magnetic disk 1020, on which data can be stored. A zone can comprise all or part of one or more circular tracks of the magnetic disk 1020. In at least some embodiments, data is written to the storage zones 1022-1024 as separate units. For example, in an embodiment where data is written to the magnetic disk 1020 using an SMR format, buffer areas can be placed between the zones 1022-1024 so that separate zones can be targeted by write operations. (Due to the overlapping nature of SMR formats, updating data requires rewriting data that is "overlapped" by the data being updated. By separating the magnetic disk 1020 into zones, only the zone containing the updated data has to be rewritten.)

The storage device controller 1030 comprises an integrated circuit (not shown) running a firmware 1040 containing various data management modules (not shown) that can be used by the storage device controller 1030 to perform various data management operations (such as data attribute-related operations, data relocation operations, etc.). The storage device controller 1030 can use such data management modules to process data access commands to retrieve data from, and write data to, the storage medium 1020. For example, the data access command module 1042 can comprise instructions for operating the actuator arm 1012, operating the spindle 1016, and operating the read/write head 1014 to retrieve data from, and write data to, the magnetic disk 1020.

The storage device controller 1030 can use one or more of the firmware modules to relocate data from one of the storage zones 1022-1024 to another of the storage zones 1022-1024. Relocating data from one storage zone to another storage zone can comprise retrieving the data from storage locations in a source storage zone using one or more random access read operations and/or one or more sequential read operations, and writing the data to a target storage zone using one or more sequential write operations. A logical address-to-physical address mapping for the relocated data can be updated to indicate that the data associated with the logical address is now stored in the target storage zone. In at least some embodiments, data associated with an attribute that indicates the data has a high I/O temperature can be moved from zone located closer to the spindle 1016 (e.g., zone 1024) to a zone located further away from the spindle 1016 (e.g., zone 1022).

Figure 11:
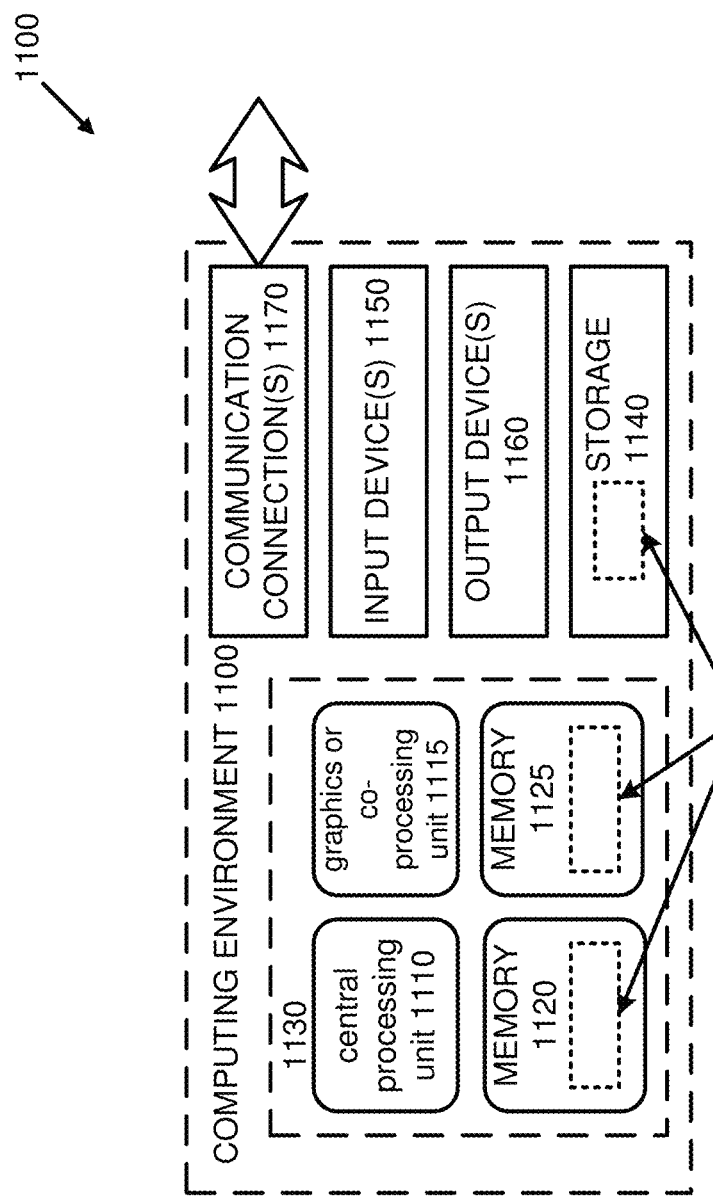
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

In at least some embodiments, the computing environment 1100 can be a host computer as described herein.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein. In at least some embodiments, the tangible storage 1140 can comprise one or more storage devices as described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system, comprising:
a host computer, comprising a processor and a memory, wherein the memory stores computer-readable instructions that, when executed by the processor, cause the host computer to perform operations, the operations comprising:
transmitting data and an associated logical address to a storage device,
monitoring an access rate for the data, and
transmitting an attribute, associated with the data, to the storage device, wherein the attribute indicates that the access rate for the data is above a specified threshold; and
the storage device, comprising a storage medium and a storage device controller, wherein the storage device controller is configured to:
write the data to a first storage location of the storage medium,
associate the logical address with the first storage location in a mapping table,
receive the attribute associated with the data from the host computer,
in response to receiving the attribute from the host computer:
determine that a second storage location can be accessed at a faster access rate than the first storage location; and
write the data to the second storage location in the storage medium; and
update the mapping table to associate the logical address with the second storage location.

2. The system of claim 1, wherein:
the storage medium comprises a magnetic disk; and
the writing the data to the second storage location comprises moving the data to a storage location that is located closer to an outer diameter of the magnetic disk than the first storage location.

3. The system of claim 1, wherein:
the writing the data to the second storage location comprises copying the data to the second storage location; and
the updating the mapping table comprises indicating that the second storage location is a duplicate storage location for the data.

4. The system of claim 1, wherein:
the storage medium is a zoned storage medium; and
writing the data to the second storage location comprises moving the data from one zone of the storage medium to another zone of the storage medium.

5. A method, comprising:
receiving a data write command at a storage device controller, wherein the data write command comprises data to be written to a storage device;
writing the data to a first storage location of the storage device;
receiving an attribute associated with the data at the storage device from a computing device connected to the storage device, wherein the attribute indicates that an access rate for the data is above a specified threshold;
responsive to receiving the attribute, determining that a second storage location can be accessed at a faster access rate than the first storage location; and
writing the data to the second storage location of the storage device based on the determining.

6. The method of claim 5, wherein:
the writing the data to the second storage location based on the attribute comprises moving the data to a storage location that is located closer to an outer diameter of a magnetic disk of the storage device than the first storage location.

7. The method of claim 5, wherein:
the attribute further indicates that the data should be duplicated; and
the writing the data to the second storage location comprises copying the data to the second storage location.

8. The method of claim 5, wherein:
the writing the data to the second storage location comprises moving the data from one zone of the storage device to another zone of the storage device.

9. The method of claim 5, wherein:
the data write command comprises a logical address associated with the data; and
the method further comprises:
updating a mapping table to associate the logical address with the first storage location after receiving the data write command; and
updating the mapping table to associate the logical address with the second storage location after receiving the attribute.

10. The method of claim 9, further comprising:
receiving a data read request from the computing device, wherein the data read request comprises the logical address for the data; and
using the logical address and the mapping table to read the data from the second storage location.

11. The method of claim 9, further comprising:
receiving the mapping table at the storage device from the computing device; and
storing the mapping table in a storage medium of the storage device.

12. The method of claim 5, wherein the writing the data to the second storage location comprises writing the data using a shingled magnetic recording format.

13. The method of claim 5, wherein:
the attribute further indicates that a write access endurance for the first storage location is below a specified endurance threshold; and
the method further comprises determining that the second storage location has a write access endurance above the specified endurance threshold.

14. A storage device comprising a storage medium and a storage device controller, wherein the storage device controller is configured to:
receive a data write command comprising data, a logical identifier for the data, and an attribute associated with the data, wherein the data write command is received from a computing device connected to the storage device;
identify a storage location in the storage medium based on the attribute associated with the data;
write the data to the storage location;
create a mapping record associating the storage location with the logical identifier for the data;

receive an updated attribute from the computing device, wherein the updated attribute indicates that an access rate for the data is above a specified threshold;

responsive to receiving the updated attribute, identify another storage location in the storage medium that can be accessed at a faster access rate than the storage location; and move the data to the another storage location.

15. The storage device of claim 14, wherein:

the attribute indicates a desired access level for the data; and the identifying the storage location in the storage medium based on the attribute comprises determining that a data access rate associated with the storage location meets or exceeds the desired access level.

16. The storage device of claim 14, wherein the storage device controller is further configured to:

update the mapping record to associate the another storage location with the logical identifier for the data.

17. The storage device of claim 14 wherein:

the updated attribute further indicates that a write access endurance for the storage location is below a specified endurance threshold; and the identifying the another storage location in the storage medium based on the updated attribute comprises determining that the another storage location has a write access endurance above the specified endurance threshold.

18. The storage device of claim 14, wherein the storage device controller is further configured to store the mapping record in the storage medium of the storage device.

* * * * *